Aug. 25, 1964 J. E. KREPPS, JR 3,146,399
SUPERHETERODYNE RECEIVER WITH HUM FILTER AND VOLTAGE REGULATION
Filed Oct. 17, 1960
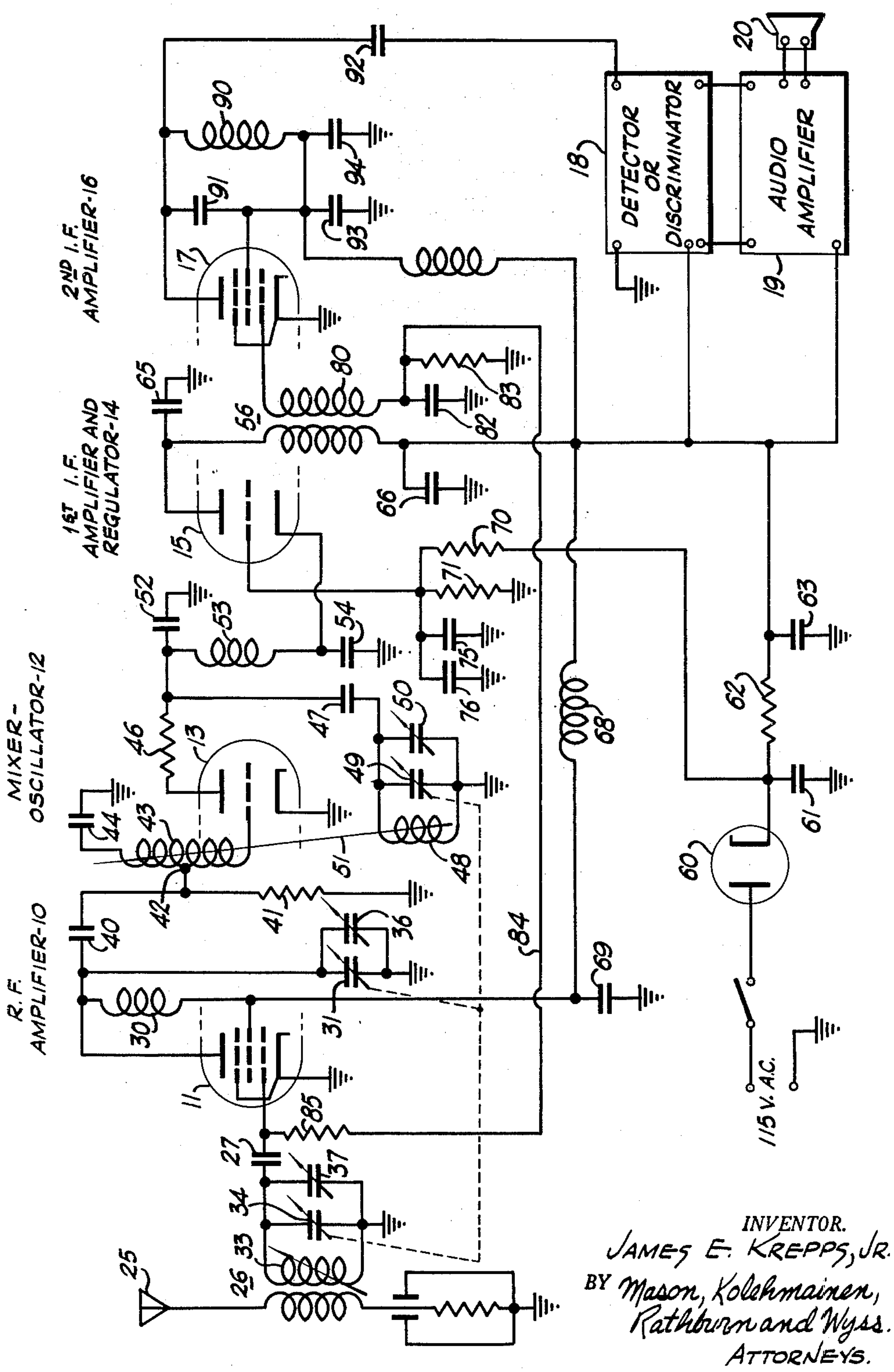
INVENTOR.
JAMES E. KREPPS, JR.
BY Mason, Kolehmainen, Rathburn and Wyss.
ATTORNEYS.

United States Patent Office 3,146,399
Patented Aug. 25, 1964

3,146,399

SUPERHETERODYNE RECEIVER WITH HUM FILTER AND VOLTAGE REGULATION

James Edgar Krepps, Jr., Bloomington, Ind., assignor to Sarkes Tarzian, Inc., Bloomington, Ind., a corporation of Indiana Filed Oct. 17, 1960, Ser. No. 63,013
10 Claims. (Cl. 325—440)

The present invention relates to signal wave receivers, more particularly to signal wave receivers of the superheterodyne type, and the invention has for its primary object the provision of a new and improved superheterodyne circuit arrangement wherein the functions of amplifying an incoming frequency wave, converting this radio frequency wave to a suitable intermediate radio frequency wave and further amplifying this intermediate wave are all accomplished by means of a circuit employing a minimum tube complement which can be manufactured on a mass production basis at low cost.

In superheterodyne receivers certain arrangements heretofore proposed have employed a so-called autodyne mixer-oscillator arrangement wherein both the functions of signal mixing and production of local oscillations are produced in one triode tube. While these arrangements have been in general satisfactory for their intended purpose, the autodyne mixer-oscillator suffered from the disadvantage that the frequency of the oscillator portion of the autodyne varies with changes in the B+ supply voltage which is impressed upon the anode of the autodyne triode. Thus, in situations where a strong incoming signal is received the amplifier stages of the superheterodyne receiver will become biased nearer to cutoff because of grid rectification or the operation of the AGC voltage so that the drain on the power supply is reduced and the B+ voltage goes up. This increase in B+ voltage causes the autodyne to vary in frequency with the result that it is necessary to retune the receiver when a strong signal is produced. Furthermore, the autodyne mixer-oscillator is quite susceptible to 60 cycle hum voltage which is impressed upon the anode of the autodyne tube for the reason that this 60 cycle hum component produces a variation in frequency of the local oscillations generated in the autodyne circuit and is extremely difficult to remove in later stages of amplification. For these reasons, the autodyne mixer-oscillator has not generally been considered of commercial value, particularly in receivers of relatively high quality.

It is, therefore, another object of the present invention to provide a new and improved superheterodyne receiver which employs an autodyne mixer-oscillator circuit while at the same time providing means for preventing variation in frequency of this autodyne circuit with changes in received signal strength.

It is a further object of the present invention to provide a new and improved superheterodyne receiver which incorporates an autodyne mixer-oscillator circuit while providing facilities for preventing this circuit from responding to 60 cycle hum components or variations in the incoming signal strength.

It is still another object of the present invention to provide a new and improved signal wave receiver of the superheterodyne type wherein the superheterodyne functions may be accomplished with a minimum tube complement while at the same time providing a circuit arrangement which may be energized from a supply potential having a relatively large cycle hum component without detracting from the quality of the received signal.

It is another object of the invention to provide a new and improved signal wave receiver of the superheterodyne type wherein a relatively hum free energizing potential is provided for the mixer-oscillator portion of the circuit by employing the first IF amplifier stage as a voltage regulator to reduce the 60 cycle hum component present in a relatively unfiltered supply voltage.

Briefly, in accordance with one phase of the present invention, all of the conventional functions of a superheterodyne receiver are performed while employing two triode-pentode type vacuum tubes. The pentode section of the first tube is employed as an RF amplifier and the amplified RF signal produced at the output of this pentode section is supplied to the triode section of the same tube which is operated as an autodyne mixer-oscillator circuit. The intermediate frequency output of the autodyne mixer-oscillator circuit is applied to the triode section of the second tube and this section operates as a first IF amplifier. The triode sections of both tubes are connected in series insofar as the B+ supply is concerned and the triode section of the second tube is operated as a voltage regulator for the B+ voltage supplied to the autodyne mixer-oscillator stage so that this latter stage is substantially insensible to variations in signal strength and the 60 cycle hum component of the power supply. As a result, an extremely simple and economical power supply may be utilized which employs only a small amount of filtering with the result that a very simple and economical power supply filter may also be employed. The pentode section of the second tube is then employed as a second IF amplifier so that a relatively large degree of amplification of the intermediate frequency signal is achieved in the second tube. At the same time, an AGC voltage is derived from the grid circuit of the pentode section of the second tube and this AGC voltage is then applied to the grid circuit of the pentode section of the first tube so as to provide AGC action without requiring a separate AGC rectifier circuit.

The invention, both as to its organization and method of operation, together with further objects and advantages thereof, will best be understood by reference to the following detailed description taken in connection with the accompanying drawing in which the single figure of the drawing is a schematic diagram of a signal wave receiver embodying the principles of the present invention.

Referring now to the single figure of the drawing, the signal wave receiver of the present invention is illustrated as comprising an RF amplifier 10, which includes a pentode section 11 of a first combined triode-pentode type tube, an autodyne mixer-oscillator circuit 12, which includes the triode portion 13 of the first tube, a first IF amplifier and regulator 14, which includes the triode section 15 of a second triode-pentode tube, a second IF amplifier 16 which includes the pentode section 17 of the second triode-pentode tube, a detector or discriminator 18, an audio amplifier 19 and a suitable loudspeaker device 20.

Considering now in more detail the manner in which the above identified component circuits function to receive signals, radio frequency signals which are received by a suitable antenna system 25 are coupled through an antenna input transformer indicated generally at 26 and through the condenser 27 to the control grid of the pentode section 11 of the first triode-pentode tube. The cathode of this pentode section is connected to ground and the suppressor grid is connected internally to the cathode within this pentode section. The pentode section 11 functions as an RF amplifier so as to provide a substantial gain for the selected radio frequency, the anode circuit of the pentode section 11 being tuned by means of the inductance 30 and the variable tuning condenser 31 whereas the input circuit of the pentode section 11 is tuned by means of the variable secondary winding 33 of the input transformer 26 and a variable tuning condenser 34, the condensers 31 and 34 being ganged to a common tuning shaft in a conventional manner. A suitable trimming condenser 36 is connected across the tuning condenser 31 and a similar condenser 37 is connected across the tuning condenser 34.

Radio frequency signals which are amplified in the pentode section 11 are coupled through a blocking condenser 40 and appear across a load impedance 41, this load resistor being connected between a tap 42 on a tuning inductance 43 and ground. A series tuning condenser 44 is connected from the upper end of the winding 43 to ground and the bottom end of the winding 43 is connected to the grid of the triode section 13 of the first triode-pentode tube. The triode section is operated as an autodyne mixer-oscillator and to this end, the cathode of the triode section is connected to ground and the anode is connected through a resistor 46 and a feedback condenser 47 to a tuned circuit comprising the inductance 48 and a variable tuning condenser 49 which are connected in parallel. The inductance 48 is variably inductively coupled to the inductance 43 so as to provide the desired amount of feedback to sustain oscillation within the triode sections. A suitable trimming condenser 50 is connected across the variable tuning condenser 49. Preferably, the two halves of the coil 43 and the coil 48 are all wound trifilarly on the same coil form so as to provide the necessary coupling for oscillation purposes and both of the coils 43 and 48 may then be tuned by a common tuning slug, as indicated by the arrow 51 in the drawing. It will be noted that the condenser 44 is connected from the upper end of the coil to ground and the grid-to-cathode capacitance of the triode section 13 connected from the bottom end of the coil 43 to ground. An oscillator signal is developed across the coil 43 but at some point on this coil there will be a virtual ground point, i.e., a point at which the oscillator voltage is zero with respect to ground. It is this virtual ground point at which the tap 42 is chosen so that the RF signal may be injected into the autodyne mixer-oscillator circuit without at the same time permitting an oscillator signal to appear in the RF stage 10 and cause undesired disturbance due to oscillator radiation.

The intermediate frequency output signal developed in the anode circuit of the autodyne mixer-oscillator 12 is coupled through a pi type filter network comprising a shunt condenser 52, a series inductance 53, and a second shunt capacitor 54 so that only the desired intermediate frequency signal is selected from the autodyne output appearing at the anode of the triode section of the tube 13.

In accordance with an important feature of the invention the triode section 15 of the second triode-pentode tube is operated as a combined IF amplifier and voltage regulator for the mixer-oscillator section 13. To this end, the triode sections 13 and 15 are connected in series to the B+ supply. More particularly, the cathode of the triode section 15 is connected to the junction of the inductance 53 and the capacitor 54 and the anode of the triode section 15 is connected through the primary winding of an IF transformer indicated generally at 56 to the B+ supply. The B+ supply comprises a half wave rectifier 60 which is connected in series with a first filter condenser 61 across the conventional 60 cycle power line. A second filtering section comprising a series resistor 62 and shunt condenser 63 is provided. The B+ voltage for all of the tubes of the receiver may be supplied from the junction of the resistor 62 and condenser 63, or, if desired, the output transformer of the audio amplifier 19 may be used in a separate filter section for this amplifier, as will be readily understood by those skilled in the art.

The primary of the IF transformer 56 is tuned by the anode capacity of the triode section 15 and a tuning capacitor 65. In addition, a bypass capacitor 66 is connected from the B+ side of the primary winding of the transformer 56 to ground so as to remove high frequency signals from the common B+ lead. The B+ voltage for the pentode RF section 11 is supplied through a further filtering section which comprises a filter choke 68 and a shunt condenser 69, the junction of these two elements being connected directly to the screen of the pentode section 11 and to the anode tuning inductance 30 thereof.

From the foregoing it will be seen that the two triode sections 15 and 13 are connected in series across the B+ supply. However, in order to cause the triode section 15 to operate as a B+ voltage regulator for the triode section 13, it is necessary to provide a stabilized reference voltage for the control grid of this section. If the bias voltage for the control grid of the triode section 15 is derived from the B+ voltage produced across the condenser 63, then this bias voltage will vary with variations in the signal strength of the received signal. This is because the variation in the signal strength will cause a variation in the current drawn by the various tubes of the receiver and since this current flows through the resistor 62 the B+ voltage produced across the condenser 63 will also vary. Also, if the voltage produced across the condenser 63 were employed as a bias source for the tube 15 a relatively large 60 cycle hum component would be present in the bias voltage and would cause undesired modulation of the B+ voltage supplied to the oscillator triode 13 with the result that the frequency of this oscillator would vary in an undesired manner at a 60 cycle rate.

In accordance with a further important feature of the invention the voltage produced across the filter condenser 61, which is ahead of the series filter resistor 62, is employed as a bias voltage source for the control grid of the triode 15. To this end a voltage divider comprising resistors 70 and 71 is connected across the condenser 61 and the control grid of the triode section 15 is connected to the junction of the resistors 70 and 71. A large filter condenser 75 is connected across the resistor 71 and the resistors 70 and 71 have relatively large resistance values, the condenser 75 preferably having a value in the order of 0.1 microfarad and the resistors 70 and 71 having respective resistance values of 1.2 megohms and 1.0 megohm. The resistor 70 and condenser 75 constitute a low pass filter having a relatively long time constant such that the voltage applied to the control grid of the triode section 15 is substantially free from any 60 cycle hum component. A second filtering condenser 76 is connected across the condenser 75, the condenser 76 preferably having a value in the order of .001 microfarad so as to remove the high frequency signal components which would otherwise be present on the control grid of the triode section 15.

From the foregoing, it will be evident that the triode section 15 functions as a grounded grid amplifier for the intermediate frequency signal which is transmitted through the filter comprising condensers 52, 54 and the inductance 53 and supplied to the cathode of the triode section 15. However, insofar as the hum components of the B+ voltage supplied to the anode of the triode section 15 is concerned, the triode section 15 acts as a voltage regulator so as to stabilize and effectively remove the 60 cycle hum component from the B+ voltage which is supplied to the anode of the triode section 13 which is operating as an autodyne mixer-oscillator. This will be readily apparent when it is realized that since a substantially hum free unidirectional voltage is applied to the control grid of the triode tube 15, the cathode voltage of this triode section will also be substantially hum free even though a B+ supply voltage having a substantial hum component is applied to the anode of the triode section 15. Since the potential of the cathode of the triode section 15 is also the anode potential of the triode section 13 the net effect is to prevent the mixer-oscillator 12 from changing its frequency of oscillation due to a 60 cycle hum component. Also, by employing the filter condenser 61 as a source of bias voltage the frequency of the oscillator portion of the mixer oscillator 12 is prevented from changing in response to variation in current drain of the tubes of the receiver on the B+ supply. In this connection it will be noted that whereas the resistor 70 has a large value for effective filtering of the 60 cycle component, the control grid of the triode section 15 does not draw any current so that there is substantially no variation in bias voltage produced at the junction of the resistors 70 and 71 due to variations in the current drain of the tubes of the receiver.

The secondary winding of the IF transformer 56 is connected to the control grid of the pentode section 17 of the second triode-pentode tube, the cathode of this tube being conected to ground and the suppressor grid being connected internally ot this cathode. In order to provide an AGC control voltage so as to control the amplification of the RF pentode section 11 in accordance with changes in the incoming signal strength, an AGC voltage is produced by grid rectification within the grid circuit of the pentode secton 17. More particularly, a filter condenser 82 is connected between the bottom end of the secondary winding 80 and ground and a load resistor 83 is connected across the condenser 82. The rectified control voltage produced across the resistor 83, which is negative with respect to ground due to the flow of grid current in the grid circuit of the pentode section 17, is connected by way of the conductor 84 and grid leak resistor 85 to the control grid of the pentode section 11. Accordingly, the bias voltage on the pentode section 11 varies in accordance with the signal strength as determined by the grid rectified voltage produced across the resistor 83.

The anode section 17 is tuned to the desired intermediate frequency by means of a tuning inductance 90 and a tuning capacitor 91, the bypass condensers 92 and 93 being provided to bypass the anode circuit insofar as both hum component voltages and undesired voltages at signal frequencies are concerned. The intermediate frequency signal developed across the tank circuit 90 is coupled through a condenser 92 to the detector or discriminator 18 wherein the signal which is modulated on the intermediate frequency wave is detected. This audio frequency signal is coupled to a suitable audio amplifier 19 wherein it is further amplified and applied to the loudspeaker 20 in a conventional manner In the event that the receiver of the present invention is arranged to receive frequency modulated signals, the circuit 18 may be employed as a frequency discriminator to detect the desired audio signal. Any suitable type of FM discriminator may be employed which normally requires one tube and the audio amplifier 19 will normally require one tube so that a complete FM receiver is provided in accordance with the present invention by the two triode-pentode tubes described in detail heretofore, the discriminator tube and the audio amplifier tube, together with the half wave rectifier 60.

While a particular embodiment of the invention has been shown, it will be understood, of course, that the invention is not limited thereto since many modifications may be made therein, and, it is, therefore, contemplated by the appended claims to cover any such modifications as fall within the true spirit and scope of the invention.

What is claimed as new and is desired to be secured by Letters Patent of the United States is:

1. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operating the triode section of said second tube as a first IF amplifier for said IF signal and as a voltage regulator for the triode section of said first tube, and fourth circuit means for operating said pentode section of said second tube as a second IF amplifier for said IF signal.

2. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operating the triode section of said second tube as a first IF amplifier for said IF signal and as a voltage regulator for the triode section of said first tube, fourth circuit means for operating said pentode section of said second tube as a second IF amplifier for said IF signal, means for deriving an AGC control voltage from the grid circuit of the pentode section of said second tube, and means for applying said AGC control voltage to the grid circuit of the pentode section of said first tube.

3. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operating the triode section of said second tube as a first IF amplifier for said IF signal, and a source of unidirectional potential having a substantial 60 cycle hum component, means for connecting the triode sections of both said first and second tubes in series across said source, a filter for substantially removing said hum component, means including said filter for connecting said source to the grid of the triode section of said second tube so that said triode section acts as a voltage regulator for the triode section of said first tube, and fourth circuit means for operating said pentode section of said second tube as a second IF amplifier for said IF signal.

4. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operating the triode section of said second tube as a first IF amplifier for said IF signal, and a source of unidirectional potential having a substantial 60 cycle hum component, means for connecting the triode sections of both said first and second tubes in series across said source, a filter for substantially removing said hum component, means including said filter for connecting said source to the grid of the triode section of said second tube so that said triode section acts as a voltage regulator for the triode section of said first tube, fourth circuit means for operating said pentode section of said second tube as a second IF amplifier for said IF signal, means for deriving an AGC control voltage from the grid circuit of the pentode section of said second tube, and means for applying said AGC control voltage to the grid circuit of the pentode section of said first tube.

5. In an FM receiver, first and second triode stages, circuit means for operating said first triode stage as a combined mixer and oscillator for received FM signals, means for deriving an IF signal from said first triode stage and supplying the same to said second triode stage, means connecting the anode of said first triode stage to the cathode of said second triode stage so that the anode-cathode space current paths of said stages are connected in series, a source of unidirectional potential having a substantial 60 cycle hum component, means for connecting the anode of said second stage to said source so that said first and second stages are connected in series across said source, a filter for substantially removing said hum component, means including said filter for connecting said source to the grid of said second triode stage, whereby said second triode stage acts as a voltage regulator for said first triode stage, and means for deriving an amplified IF signal from the anode of said second triode stage without substantial amplification of said hum component.

6. In an FM receiver, first and second triode stages, circuit means for operating said first triode stage as a combined mixer and oscillator for received FM signals, means for deriving an IF signal from said first triode stage and supplying the same to said second triode stage, means connecting the anode of said first triode stage to the cathode of said second triode stage so that the anode-cathode space current paths of said stages are connected in series, a source of unidirectional potential having a substantial 60 cycle hum component, means for connecting the anode of said second stage to said source so that said first and second stages are connected in series across said source, filter means for deriving a unidirectional potential from said source which is substantially free from said hum component, means for supplying the unidirectional potential derived from said filter means to the grid of said second triode stage, whereby said second triode stage acts as a voltage regulator for said first triode stage, and means for deriving an amplified IF signal from the anode of said second triode stage.

7. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operating the triode section of said second tube as a first IF amplifier for said IF signal, a power rectifier, a first condenser, means for supplying an alternating current to said rectifier so that a rectified alternating current is produced across said first condenser, a power supply filter including a series resistor and shunt condenser connected across said first condenser in such manner that a unidirectional potential having a substantial alternating hum component is produced across said shunt condenser, means for supplying the potential produced across said shunt condenser to the pentode sections of both said tubes in parallel, a filter for substantially removing hum components of the frequency of said alternating current, means including said filter for connecting the grid of the triode section of said second tube to said first condenser so that said triode section acts as a voltage regulator for the triode section of said first tube, and fourth circuit means for operating said pentode section of said second tube as a second IF amplifier for said IF signal.

8. In an FM receiver, first and second triode-pentode tubes, first circuit means for operating the pentode section of said first tube as an RF amplifier for received FM signals, second circuit means for operating the triode section of said first tube as a combined mixer and oscillator for producing an IF signal in response to signals amplified by said RF amplifier, third circuit means for operaitng the triode section of said second tube as a first IF amplifier for said IF signal, a power supply circuit including a power filter circuit having an input and an output for developing a substantially unidirectional potential, means for connecting the triode sections of both said first and second tubes in series across the output of said power filter circuit, the input of said power filter circuit containing a substantial hum component, a hum filter, means including said hum filter for connecting the input of said power filter circuit to the grid of the triode section of said second tube so that said triode section acts as a voltage regulator for the triode section of said first tube, means for deriving an AGC control voltage which varies in accordance with variations in said IF signal, and means for applying said AGC control voltage to the grid circuit of the pentode section of said first tube.

9. In a modulated signal receiver, an RF stage for amplifying a received signal, first and second triode stages, circuit means for operating said first triode stage as a combined mixer and oscillator for a received signal amplified by said RF stage, means for deriving an IF signal from said first triode signal and supplying the same to said second triode stage, means connecting the anode of said first triode stage to the cathode of said second triode stage so that the anode-cathode space current paths of said first and second triode stages are connected in series, means for developing an AGC control voltage which varies in accordance with variations in said IF signal, means for applying said AGC control voltage to said RF stage, a power supply circuit for developing a substantially unidirectional potential and having first and second terminals, the potential which is developed at said first terminal including a substantial hum component, means for connecting the anode of said second triode stage to said second terminal, means connecting said RF stage to said second terminal, means including a hum filter connected to said first terminal for deriving a unidirectional potential which is substantially free from said hum component, means for supplying said last named unidirectional potential to the grid of said second triode stage, whereby said second triode stage acts as a voltage regulator for said first triode stage, and means for deriving an amplified IF signal from the anode of said second triode stage.

10. In a modulated signal receiver, an RF stage for amplifying a received signal, first and second triode stages, circuit means for operating said first triode stage as a combined mixer and oscillator for a received signal amplified by said RF stage, means for deriving an IF signal from said first triode signal and supplying the same to said second triode stage, means connecting the anode of said first triode stage to the cathode of said second triode stage so that the anode-cathode space current paths of said first and second triode stages are connected in series, means for developing an AGC control voltage which varies in accordance with variations in said IF signal, means for applying said AGC control voltage to said RF stage, a power supply circuit for developing a substantially unidirectional potential and having first and second terminals, the potential which is developed at said first terminal including a substantial hum component, means for connecting the anode of said second triode stage and the anode of said RF stage to said second terminal of said power supply circuit, means including a hum filter connected to said first terminal for deriving a unidirectional potential which is substantially free from said hum component, means for supplying said last name unidirectional potential to the grid of said second triode stage, whereby said second triode stage acts as a voltage regulator for said first triode stage, and means for deriving an amplified IF signal from the anode of said second triode stage.

References Cited in the file of this patent

UNITED STATES PATENTS

| | | |
|---|---|---|
| 2,525,151 | Stenning | Oct. 10, 1950 |
| 2,571,309 | Tellier | Oct. 16, 1951 |
| 2,811,636 | Achenbach | Oct. 29, 1957 |
| 3,009,058 | Bodez | Nov. 14, 1961 |

FOREIGN PATENTS

| | | |
|---|---|---|
| 737,646 | Great Britain | Sept. 28, 1955 |
| 964,688 | Germany | May 29, 1957 |
| 802,809 | Great Britain | Oct. 15, 1958 |